United States Patent
Shimono et al.

(10) Patent No.: US 12,017,349 B2
(45) Date of Patent: Jun. 25, 2024

(54) HAPTIC TRANSMISSION SYSTEM, HAPTIC TRANSMISSION METHOD, AND PROGRAM

(71) Applicants: KANAGAWA INSTITUTE OF INDUSTRIAL SCIENCE AND TECHNOLOGY, Ebina (JP); KEIO UNIVERSITY, Tokyo (JP)

(72) Inventors: Tomoyuki Shimono, Kanagawa (JP); Takahiro Mizoguchi, Kanagawa (JP); Kouhei Ohnishi, Kanagawa (JP); Tetsuya Tashiro, Kanagawa (JP)

(73) Assignees: KANAGAWA INSTITUTE OF INDUSTRIAL SCIENCE AND TECHNOLOGY, Kanagawa (JP); KEIO UNIVERSITY, Tokyo (JP)

( * ) Notice: Subject to any disclaimer, the term of this patent is extended or adjusted under 35 U.S.C. 154(b) by 961 days.

(21) Appl. No.: 16/978,748

(22) PCT Filed: Mar. 7, 2019

(86) PCT No.: PCT/JP2019/009136
§ 371 (c)(1),
(2) Date: Nov. 20, 2020

(87) PCT Pub. No.: WO2019/172383
PCT Pub. Date: Sep. 12, 2019

(65) Prior Publication Data
US 2021/0107134 A1    Apr. 15, 2021

(30) Foreign Application Priority Data

Mar. 8, 2018  (JP) ................................ 2018-042238

(51) Int. Cl.
*B25J 3/00*     (2006.01)
*B25J 13/02*    (2006.01)
*B25J 9/16*     (2006.01)

(52) U.S. Cl.
CPC ............... *B25J 3/00* (2013.01); *B25J 13/025* (2013.01); *B25J 9/1664* (2013.01); *B25J 9/1689* (2013.01)

(58) Field of Classification Search
CPC . B25J 3/00; B25J 13/025; B25J 9/1664; B25J 9/1689
(Continued)

(56) References Cited

U.S. PATENT DOCUMENTS

2014/0320436 A1* 10/2014 Modarres .............. G06F 1/1652
345/173
2015/0227204 A1*  8/2015 Gipson .................. G06F 3/016
345/156
(Continued)

FOREIGN PATENT DOCUMENTS

JP       H02279285 A     11/1990
JP         07171776 A  *  7/1995 ................ C10L 1/06
(Continued)

OTHER PUBLICATIONS

International Search Report (ISR) (and English translation thereof) dated May 21, 2019 issued in International Application No. PCT/JP2019/009136.
(Continued)

*Primary Examiner* — Kerri L McNally
(74) *Attorney, Agent, or Firm* — Holtz, Holtz & Volek PC (57) ABSTRACT

A haptic transmission system includes a master device and a slave device. The master device controls position and force in an operation of the master device based on information acquired from the operation of the master device and information relating to a response of the slave device, and compensates for a communication delay in a communication path with respect to the control of force. The slave device controls speed and force in an operation of the slave device
(Continued)

based on information acquired from the operation of the slave device and information relating to control from the master device.

8 Claims, 8 Drawing Sheets

(58) Field of Classification Search
USPC .......................................................... 340/407
See application file for complete search history.

(56) References Cited

U.S. PATENT DOCUMENTS

2017/0050310 A1* 2/2017 Kanaoka ................ B25J 13/088
2018/0243918 A1   8/2018 Noguchi et al.

FOREIGN PATENT DOCUMENTS

| JP | H07171776 | A |   | 7/1995 |
| JP | H08328626 | A |   | 12/1996 |
| JP | 2006000977 | A |   | 1/2006 |
| JP | 2008119757 | A | * | 5/2008 |
| JP | 2008119757 | A |   | 5/2008 |
| JP | 2017071012 | A |   | 4/2017 |
| WO | 2017033391 | A1 |  | 3/2017 |

OTHER PUBLICATIONS

Written Opinion dated May 21, 2019 issued in International Application No. PCT/JP2019/009136.

* cited by examiner

FIG. 7

HAPTIC TRANSMISSION SYSTEM, HAPTIC TRANSMISSION METHOD, AND PROGRAM

TECHNICAL FIELD

The present invention relates to a haptic transmission system, a haptic transmission method, and a program.

BACKGROUND ART

Conventionally, techniques for performing haptic transmission through bilateral control have been implemented. Moreover, with recent-year advances in information and telecommunications technology, there are increasing cases where bilateral control is performed at a remote location. For example, Patent Document 1 describes a technique for performing bilateral control at a remote location.

Patent Document 1: Japanese Unexamined Patent Application, Publication No. 2017-071012

DISCLOSURE OF THE INVENTION

Problems to be Solved by the Invention

However, when position and force control such as bilateral control is performed at a remote location, a communication delay may cause degradation in control performance and instability of a control system in some cases. Here, while a technique and the like that use CDOB (Communication Disturbance Observer) to restrain the effects caused by a communication delay have been proposed, such a technique is not a sufficient solution when high-precision control is required for both position and force, for reasons such as not getting beyond enhancing precision in position control. In other words, according to the conventional technique, precision in force control is not sufficient in teleoperated bilateral control.

An object of the present invention is to enhance precision in force control in teleoperated bilateral control.

Means for Solving the Problems

To achieve the object, a haptic transmission system of an aspect of the present invention is a haptic transmission system including a master device and a slave device connected through a communication path, the haptic transmission system including:

in the master device,
a position control section that controls position in motion of the master device, based on information acquired from the motion of the master device, and information relating to a response of the slave device;
a force control section that controls force in the motion of the master device, based on the information acquired from the motion of the master device, and the information relating to the response of the slave device; and
a delay compensation section that compensates for a communication delay in the communication path, with respect to control by the force control section, and in the slave device,
a velocity control section that controls velocity in motion of the slave device, based on information acquired from the motion of the slave device, and information relating to control from the master device; and
a force control section that controls force in the motion of the slave device, based on the information acquired from the motion of the slave device, and the information relating to the control from the master device.

Effects of the Invention

According to the present invention, precision in force control in teleoperated bilateral control can be enhanced.

PREFERRED MODE FOR CARRYING OUT THE INVENTION

Hereinafter, an embodiment of the present invention will be described with reference to drawings.
[Basic Concept in the Present Invention]

When bilateral control is performed between a master and a slave that are remotely connected through a communication path, a haptic transmission system according to the present invention makes it possible to restrain effects of communication delays and to adequately ensure precision in force and position control. To implement such functionality, in the haptic transmission system according to the present invention, the master is provided with a position controller and a force controller, and the slave is provided with a velocity controller and a force controller. Moreover, in the master, communication delay compensation is applied for the force controller. As a result, the slave side touches an environment (contact object) with a force identical to a force applied by an operator on the master side. In other words, soft touching motion over which the master operator is dominant, that is, haptic transmission from the master side to the slave side, is realized. Thus, accurate force balance is achieved under communication delays, and high-precision haptic transmission is attained. Hereinafter, a basic concept in the present invention will be described specifically.
[Implementation of Communication Delay Compensation]

Figure 1:
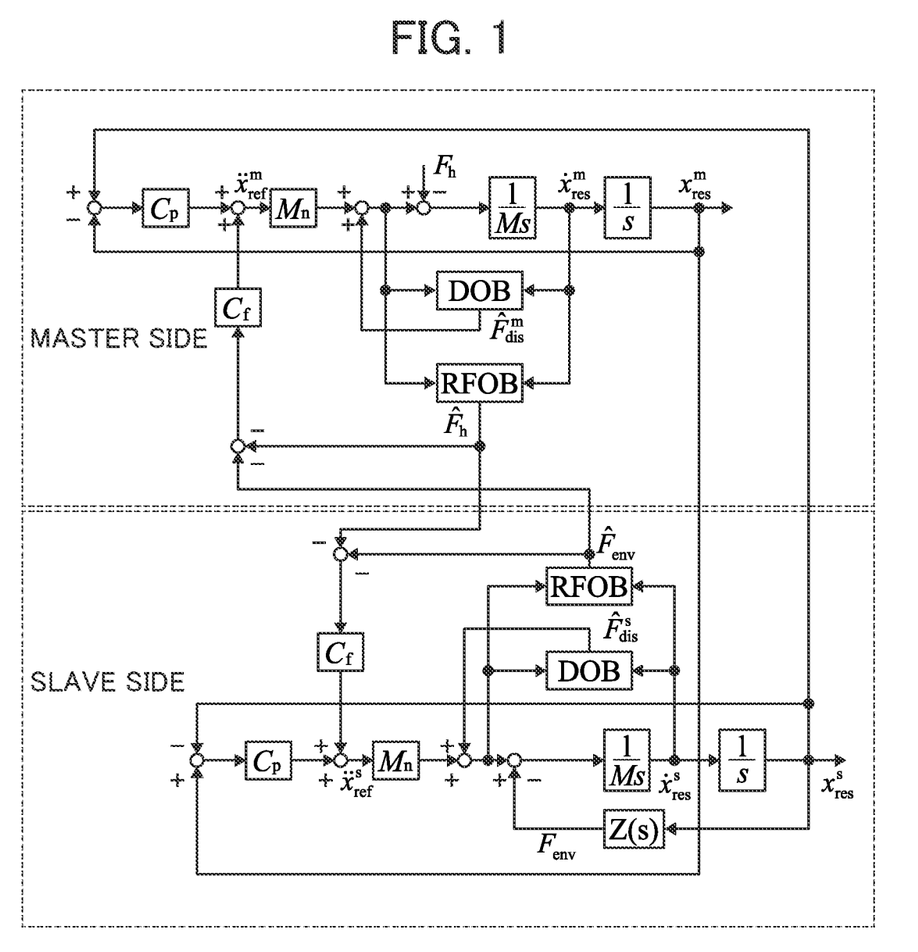
FIG. 1 is a block wiring diagram of a basic system that implements bilateral control.

FIG. 1 is a block wiring diagram of a basic system that implements bilateral control. In FIG. 1, it is assumed that M denotes motor inertia, Mn denotes a nominal value of motor inertia, and Z (s) denotes an environment impedance where Laplace operator a is a variable. Note that in the block wiring diagram of FIG. 1, each block is represented as a Laplace transform s-domain function (the same applies to block wiring diagrams below). The system shown in FIG. 1 implements haptic transmission between a master and a slave without via a communication path, in a system where there is no communication delay. In the system shown in FIG. 1, formulas (1), (2) are true, between respective positions x and respective forces F at the master and the slave.

$$x_m - x_s = 0 \tag{1}$$

$$F_m - F_s = 0 \tag{2}$$

where a subscript m indicates the master, and a subscript s indicates the slave.

Formulas (1), (2) represent a state where a difference in position between the master and the slave is zero, and a sum of the forces at the master and the slave is zero (The forces at the master and the slave have opposite directions and equal quantities). Here, in the bilateral control shown in FIG. 1, a disturbance observer DOB (Disturbance Observer) and a reaction force estimation observer RFOB (Reaction Force Observer) are provided on each of the master side and the slave side. Robust control is achieved by the DOB, and reaction force estimation without using a force sensor is attained by the RFOB. Respective acceleration reference values $d^2/dt^2 x_m(\text{ref})$, $d^2/dt^2 x_s(\text{ref})$ of the master and the slave in the system shown in FIG. 1 are represented by formulas (3), (4).

$$\ddot{x}_m(\text{ref}) = C_p(x_s(\text{res}) - x_m(\text{res})) - C_f(\hat{F}_h + \hat{F}_{env}) \tag{3}$$

$$\ddot{x}_s(\text{ref}) = C_p(x_m(\text{res}) - x_s(\text{res})) - C_f(\hat{F}_h + \hat{F}_{env}) \tag{4}$$

where Fh-hat denotes an estimation value of force at a time of manipulation by an operator, Fenv-hat denotes an estimation value of environment reaction force (reaction force from a contact object), and Cp and Cf denote the position controller and the force controller, respectively. Moreover, $x_s(\text{res})$ denotes a response position at the slave, and $x_m(\text{res})$ denotes a response position at the master. In FIG. 1, suffixed letters "ref" indicating a reference value and suffixed letters "res" indicating a response are presented as subscripts, and a suffixed letter "m" indicating the master and a suffixed letter "s" indicating the slave are presented as superscripts (similar presentation is used as appropriate for suffixed letters "dis" indicating disturbance and the like, in diagrams below).

Cp and Cf in formulas (3), (4) are represented by formulas (5), (6).

$$Cp = Kp + Kv \tag{5}$$

$$Cf = Kf \tag{6}$$

where Kp denotes a position gain, Kv denotes a velocity gain, and Kf denotes a force gain.

In formulas (3), (4), the position controller Cp implements position tracking, and the force controller Cf implements force balance. Master-slave position tracking and force balance are achieved at the same time by performing control based on formulas (3), (4). Accordingly, in the system shown in FIG. 1, accurate haptic transmission is attained through bilateral control.

Figure 2:
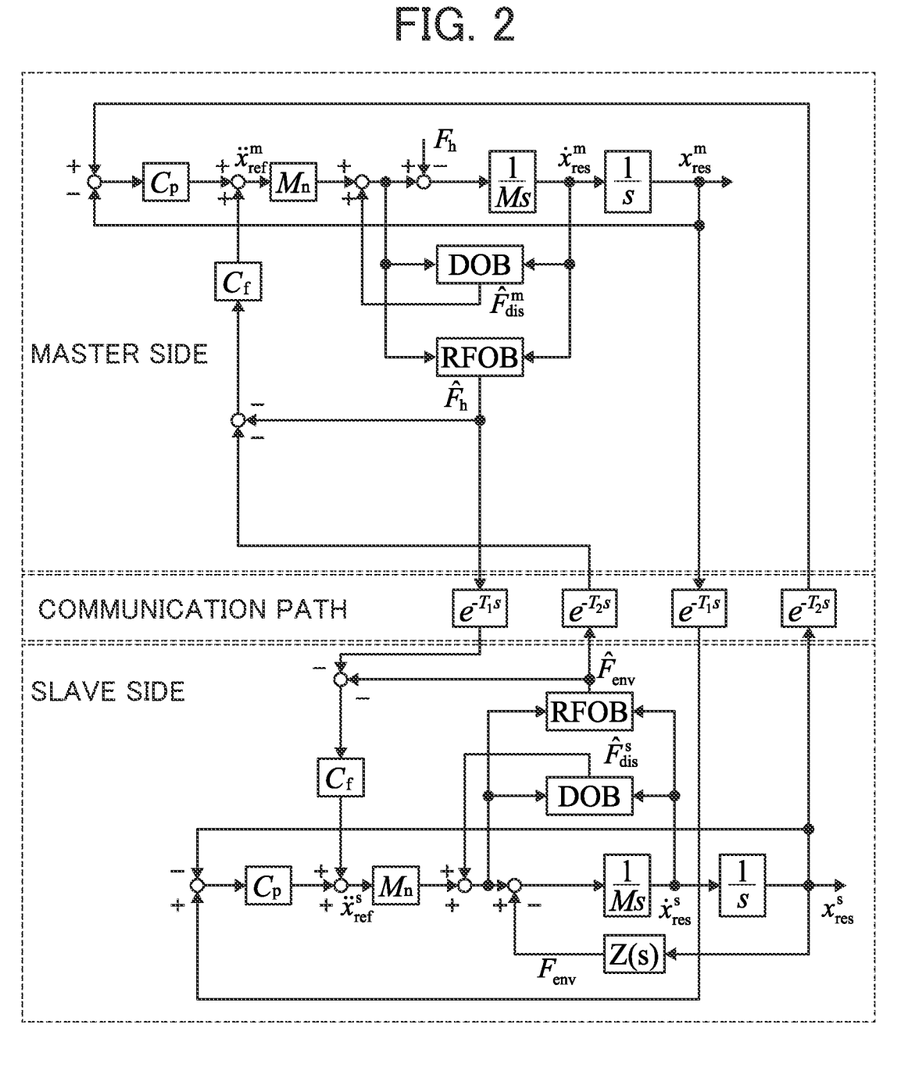
FIG. 2 is a block wiring diagram showing bilateral control with presence of communication delays.

In contrast, between a master and a slave remotely connected through a network, communication delays T1 and T2 occur because control information is exchanged through the network. Due to such communication delays, performance of a control system may be degraded, and may become instable for the control system. FIG. 2 is a block wiring diagram showing bilateral control with presence of communication delays. In the system shown in FIG. 2, in contrast to the system shown in FIG. 1, the communication delay T1 occurs in communication from the master to the slave, and the communication delay T2 occurs in communication from the slave to the master, due to a communication path existing between the master and the slave. Respective acceleration reference values $d^2/dt^2 x_m(\text{ref})$, $d^2/dt^2 x_s(\text{ref})$ of the master and the slave in the system shown in FIG. 2 are represented by formulas (7), (8).

$$\ddot{x}_m(\text{ref}) = C_p(x_s(\text{res})e^{-T2s} - x_m(\text{res})) - C_f(\hat{F}_h + \hat{F}_{env}e^{-T2s}) \tag{7}$$

$$\ddot{x}_s(\text{ref}) = C_p(x_m(\text{res})e^{-T2s} - x_s(\text{res})) - C_f(\hat{F}_h e^{-T1s} + \hat{F}_{env}) \tag{8}$$

Referring to formulas (7), (8), at both the master and the slave, it can be seen that effects are caused by the communication delays in the position controllers and the force controllers. Due to such effects, both position tracking and force balance are degraded, so that accurate haptic transmission is not achieved, and it is therefore difficult to attain high-precision teleoperation control. Accordingly, in the configuration shown in FIG. 2, a DOB and an RFOB for communication delay compensation are newly provided on the master side, in addition to the DOB and the BLOB used for control of the master.

Figure 3:
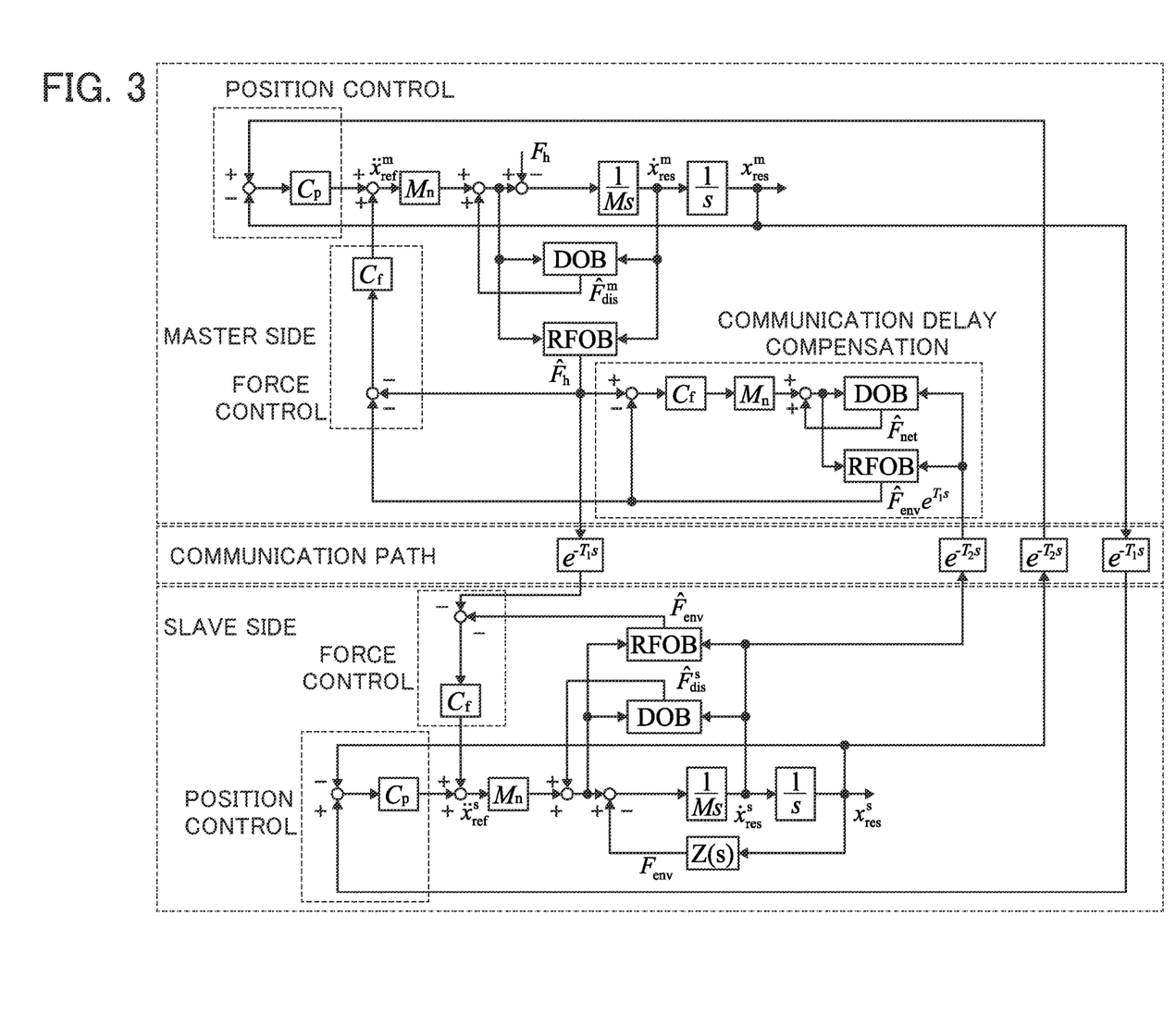
FIG. 3 is a block wiring diagram showing bilateral control provided with DOB and RFOB for communication delay compensation.
Figure 4:
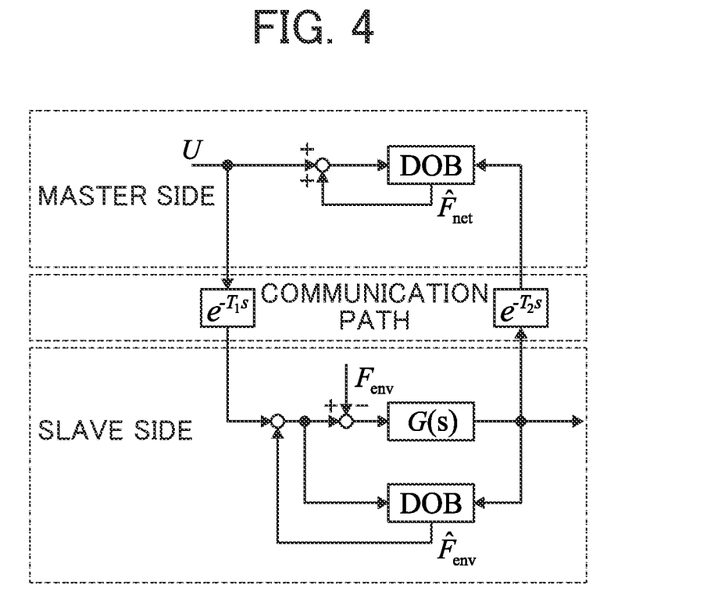
FIG. 4 is a block wiring diagram showing action of the communication delay compensation on a force controller.

FIG. 3 is a block wiring diagram showing bilateral control provided with DOB and RFOB for communication delay compensation. FIG. 4 is a block wiring diagram showing action of the communication delay compensation on the force controller. In the block wiring diagrams shown in FIGS. 3 and 4, an estimation value of disturbance (Fnet-hat) is represented by formula (9).

$$\hat{F}_{net} = (U + \hat{F}_{net}) - (Ue^{-T1s} + \hat{F}_{env} - F_{env})G(s)e^{-T2s}G^{-1}(s) \tag{9}$$

where $G^{-1}(s)$ is an inverse function of a control target model in the DOB, and U denotes an input. Since the communication delays T1, T2 can be regarded as communication disturbances D1, D2, formula (9) can be translated into formula (10).

$$\hat{F}_{net} = (U + \hat{F}_{net}) - (U - D1 + \hat{F}_{env} - F_{env} - D2) \tag{10}$$
$$= (\hat{F}_{net} - \hat{F}_{env}) + D1 + D2 + F_{env}$$

Referring to formula (10), from a viewpoint of the master side, the communication disturbance D1 causes a delay of T1 in an estimation value of environment reaction force (Fenv-hat) that is a response on the slave side and an environment reaction force (Fenv), compared with the estimation value of disturbance (Fnet-hat). The communication disturbance D2 causes a delay of T2 in the estimation value of environment reaction force (Fenv-hat) that is information transmitted from the slave to the master. Accordingly, formula (10) can be translated into formula (11).

$$\hat{F}_{net} = (\hat{F}_{env}e^{T1s} - \hat{F}_{env}e^{-T2s}) + F_{env}e^{-T2s} \tag{11}$$

Since the feedback information from the slave is affected by the communication delays, the estimation value of disturbance (Fnet-hat) includes dead-time elements in addition to the environment reaction force (Fenv). Accordingly, a difference between first and second terms in formula (11) is a communication delay compensation value for the communication delays, as shown in formula (12).

$$\hat{F}_{net} = (\hat{F}_{env}e^{T1s} - \hat{F}_{env}e^{-T2s}) + F_{env}e^{-T2s} \tag{12}$$
$$= F_{env}(e^{T1s} - e^{-T2s}) + F_{env}e^{-T2s}$$
$$= F_{env}e^{T1s}$$

Referring to formula (12), in the master-side DOB, the estimation value of disturbance (Fnet-hat) is information that is advanced by T1 from an actual timing of occurrence of a disturbance. In other words, according to formula (12), it can be seen that a disturbance that does not include the effects of the communication delays is estimated, and that communication delay compensation is attained with respect to the force controller. When a disturbance Fdis applied to the slave side includes not only the environment reaction force (Fenv) but also disturbances such as a friction force (Ffric) and a gravity (Fg) as indicated by formula (13), such extra disturbance terms are compensated for in the RFOB, as shown in formula (14).

$$F_{dis}F_{env}+F_{fric}F_g \tag{13}$$

$$\hat{F}_{env}=\hat{F}_{dis}+(\hat{F}_{fric}+\hat{F}_g)=F_{env} \tag{14}$$

Through the delay compensation as described above, the estimation value of environment reaction force including no dead time is used for control in the master side force controller, in place of feedback of an actual force estimation value. Accordingly, an acceleration reference value on the master side is represented by formula (15).

$$\ddot{x}_m(\text{ref})=Cp(x_s(\text{res})e^{-T2s}-x_m(\text{res}))-Cf(\hat{F}_h+\hat{F}_{env}e^{T1s}) \tag{15}$$

Since the communication delay T1 is present in communication from the master side to the slave side, a master-slave relationship in force at a time of touching motion is represented by formula (16).

$$\hat{F}_h e^{T1s}=-F_{env} \tag{16}$$

According to formula (16), it can be seen that at the time of touching motion, the effect of the communication delay is absent in the force controller. In other words, it can be confirmed that according to the present invention, communication delay compensation for the force controller is attained in bilateral control under communication delays.

[Consideration of Control Stiffness]

Next, consideration will be given to control stiffness in a case where communication delay compensation is implemented by the present invention. Output in motion control is a position and a force, and, assuming that the position is x and the force is f, a control stiffness k is represented by formula (17).

$$k=\frac{\partial f}{\partial x} \tag{17}$$

In bilateral control, position control and force control are independently performed. In other words, position tracking is implemented by the position controllers, and force balance is implemented by the force controllers. To put it another way, based on control stiffness, position control is dominant in free motion, and force control is dominant in touching motion. If force control is dominant in touching motion, a great error in position may be caused at a time of touching motion when bilateral control is under communication delays. Since the position controllers, for such a reason, act so as to eliminate the error in position, a force greater than a force applied to the system by the master operator is generated on the slave side in some cases. In such a case, force balance cannot be achieved.

Accordingly, in the present invention, in order not to generate an excessive force at a time of touching motion, a control gain relating to position control on the slave side is set to be smaller than when there is no communication delay.

Note that a force excessively generated on the slave side is represented by formula (18), from which it can be seen that such a force depends on a position controller gain.

$$\hat{F}_s=-(\hat{F}_m+Cp(x_m-x_s)) \tag{18}$$

Referring to formula (18), to achieve accurate force balance, it is desirable that the position controller gain is set to be as small as possible, ideally to zero. Accordingly, in the present invention, the position controller gain is set to zero.

On the other hand, when the position controller gain is set to zero, position control is not performed on the slave side, so that the slave side exhibits free and quick behavior. Accordingly, as a braking role, the slave side is provided with velocity control. By making a controller design as described above, accurate force balance is attained under communication delays.

Moreover, in the present invention, a gain of the position controller of the master is set to be smaller than when there is no communication delay, in order to enhance manipulability of the master. If a large gain (equivalent to a gain when there is no communication delay) is set on the position controller of the master, an excessively great manipulation force is generated at a time of free motion due to effects of communication delays because the master attempts to track position of the slave with high control stiffness. In contrast, a manipulation force caused by the effects of communication delays can be restrained by setting the gain of the position controller of the master to be smaller than when there is no communication delay. Accordingly, in the present invention, in order to reduce a manipulation force generated on the master side, the gain of the position controller is set to be smaller than when there is no communication delay.

Figure 5:
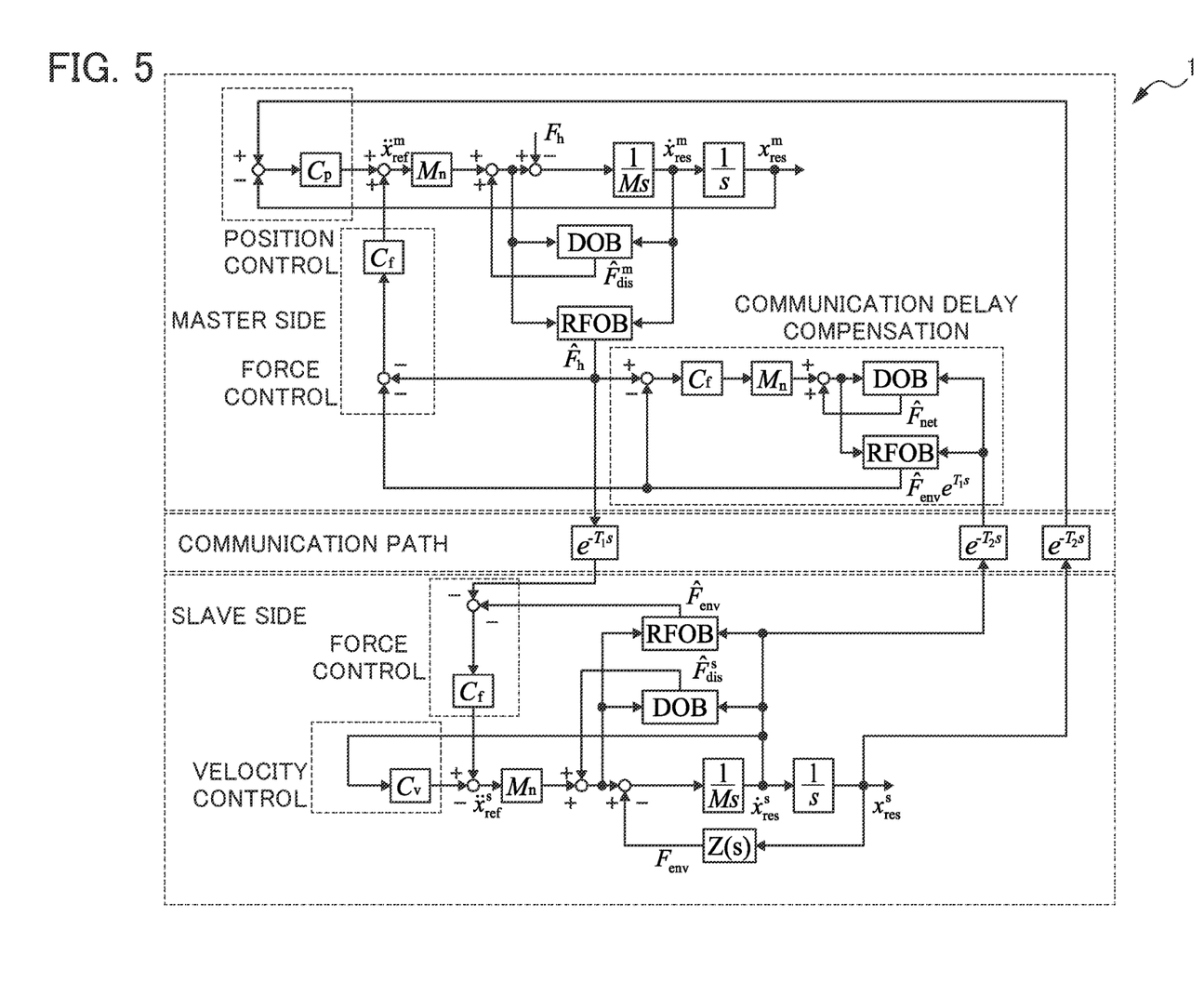
FIG. 5 is a block wiring diagram showing bilateral control to which the present invention is applied.

FIG. 5 is a block wiring diagram showing bilateral control to which the present invention is applied. In a system shown in FIG. 5, a master is provided with position control and force control, and a slave is provided with velocity control and force control. Moreover, on the master side, communication delay compensation is applied for a force controller. Respective acceleration reference values $d^2/dt^2x_m(\text{ref})$, $d^2/dt^2x_s(\text{ref})$ of the master and the slave in the system shown in FIG. 5 are represented by formulas (19), (20).

$$\ddot{x}_m(\text{ref})=Cp(x_s(\text{res})e^{-T2s}-x_m(\text{res}))-Cf(\hat{F}_h+\hat{F}_{env}e^{-T1s}) \tag{19}$$

$$\ddot{x}_s(\text{ref})=Cv(-\dot{x}_s(\text{res}))-Cf(\hat{F}_h e^{-T1s}+\hat{F}_{env}) \tag{20}$$

By performing bilateral control based on the acceleration reference values represented by formulas (19), (20), the slave touches a environment with a force identical to a force applied to the master by an operator. In other words, soft touching motion over which the master operator is dominant, that is, haptic transmission from the master side to the slave side, is realized. Thus, accurate force balance is achieved under communication delays, and high-precision haptic transmission is attained accordingly, precision in force control can be enhanced in teleoperated bilateral control.

Next, a haptic transmission system to which the present invention is applied will be described.

[Configuration]

Figure 6:
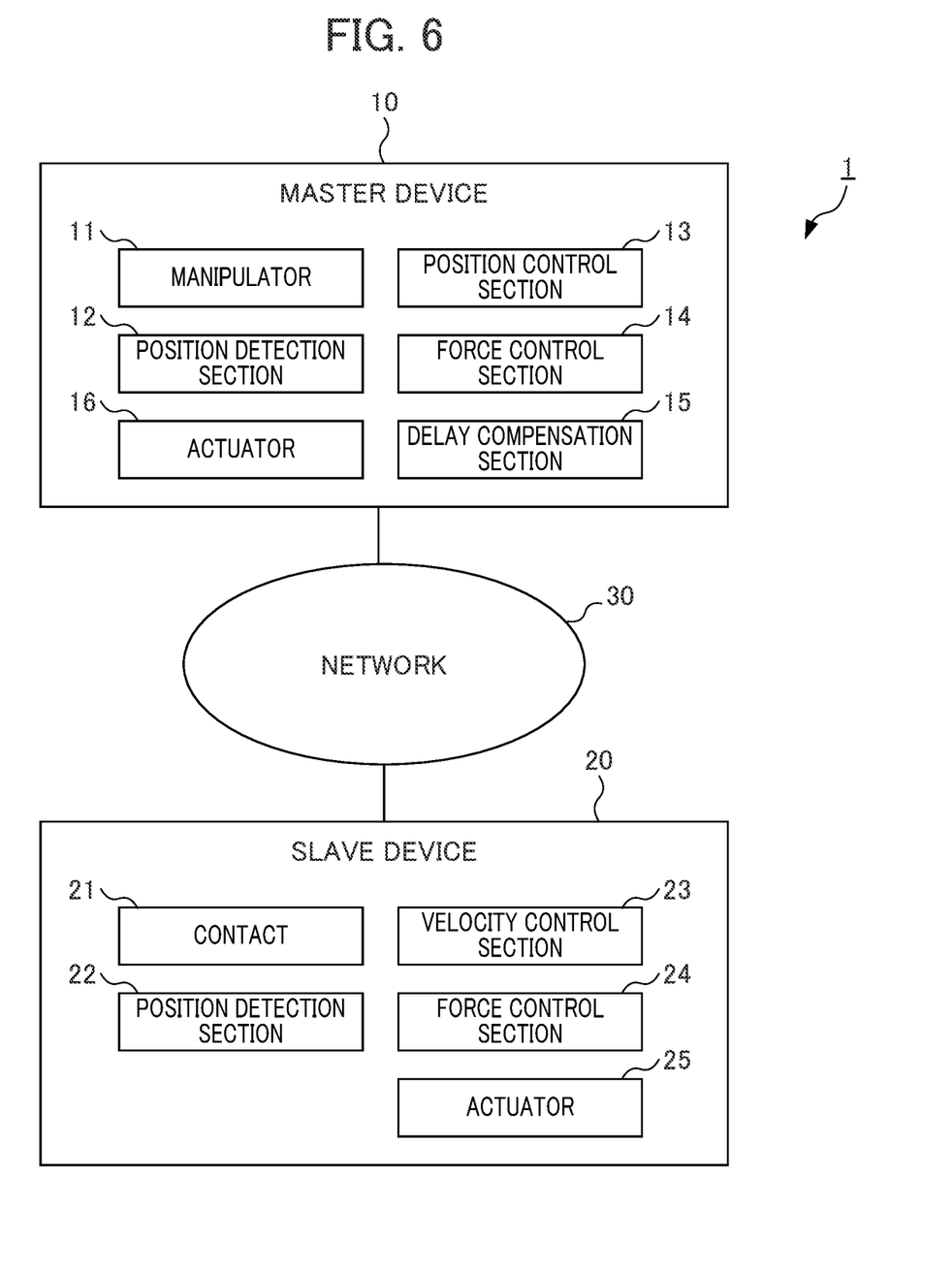
FIG. 6 is a block diagram showing a configuration of a haptic transmission system to which the present invention is applied.

FIG. 6 is a block diagram showing a configuration of a haptic transmission system 1 to which the present invention is applied. As shown in FIG. 6, the haptic transmission system 1 includes a master device 10 and a slave device 20, and the master device 10 and the slave device 20 are configured to be communicable through a network 30 including a dedicated transmission line or a public network such as the Internet.

The master device 10 is configured by using a device including: a manipulator (manipulation member) 11 that is manipulated through manipulation by an operator; a position detection section 12 that detects a position of the manipulator 11; a position control section 13 that controls the position of the manipulator 11, based on the position of the manipulator 11 and a response from the slave device 20 (information on a position and a force at the slave device 20); a force control section 14 that controls a force output by the manipulator 11, based on a force calculated based on the position of the manipulator 11, and the response from the slave device 20; a delay compensation section 15 that compensates for a communication delay with respect to force control in the force control section 14; and an actuator 16 that controls the position of the manipulator 11 and the force output by the manipulator 11. Note that in the present embodiment, the position of the manipulator 11 is translated into a value in dimensions of acceleration (acceleration reference value) or the like as appropriate and then used. The position control section 13, the force control section 14, and the delay compensation section 15 in the master device 10 include, for example, the functions of position control, force control, and delay compensation in the block wiring diagram shown in FIG. 5.

The slave device 20 is configured by using a device including: a contact (contact member) 21 that touches a contact object; a position detection section 22 that detects a position of the manipulator 11; a velocity control section 23 that controls a moving velocity of the contact, based on a control signal from the master device 10 (information on a position and a force at the master device 10) and action from the object; a force control section 24 that controls a force output by the contact, based on the control signal from the master device 10 and the action from the object; and an actuator 25 that controls the moving velocity of the contact and the force output by the contact. Note that in the present embodiment, the position of the manipulator 11 is translated into a value in the dimensions of acceleration (acceleration reference value) or the like as appropriate and then used. The velocity control section and the force control section in the slave device 20 include, for example, the functions of velocity control and force control in the block wiring diagram shown in FIG. 5.

[Motion]

In the configuration shown in FIG. 6, in a state where the contact 21 of the slave device 20 is not in contact with the contact object, the delay compensation section 15 performs delay compensation between the master device 10 and the slave device 20, whereby haptics from the slave device 20 is transmitted to the master device 10 in a state where effects of communication delays are restrained. At the time, in the slave device 20, the moving velocity of the contact is restrained due to the function of the velocity control section 23, and accurate force balance is attained under communication delays. At the master device 10, since the gain of position control is set to be smaller than when there is no communication delay, a situation can be prevented where an excessive manipulation force (a force tracking the position of the slave device 20) is generated in the matter device 10.

Here, when the contact 21 of the slave device 20 touches the contact object, an error in control occurs between a position of the contact 21 of the slave device 20 and a position of the manipulator 11 of the master device 10. However, since position control is not performed at the slave device 20, a situation can be prevented where a force greater than a force applied to the manipulator 11 by the operator of the master device 10 is generated in the contact of the slave device 20. Accordingly, force balance can be maintained between the master device 10 and the slave device 20. Through such motion, the slave device 20 touches the environment (contact object) with a force identical to a force applied to the manipulator 11 of the master device 10 by the operator. In other words, soft touching motion over which the operator of the master device 10 is dominant, that is, haptic transmission from the master device 10 to the slave device 20, is realized. Thus, accurate force balance is achieved under communication delays, and high-precision haptic transmission is attained.

Advantageous Effects

Figure 7:
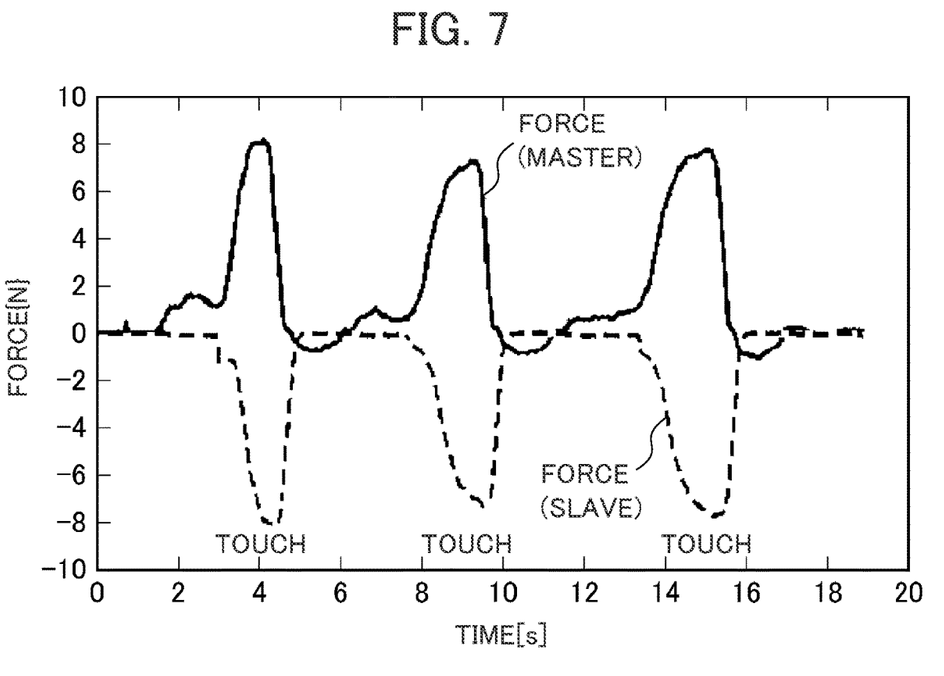
FIG. 7 is a schematic diagram showing force responses in the bilateral control to which the present invention is applied.

FIG. 7 is a schematic diagram showing force responses in the bilateral control to which the present invention is applied. As shown in FIG. 7, in the bilateral control to which the present invention is applied, it can be seen that accurate force transmission is attained between the master and the slave as a result of performing communication delay compensation for the force control at the master.

Figure 8:
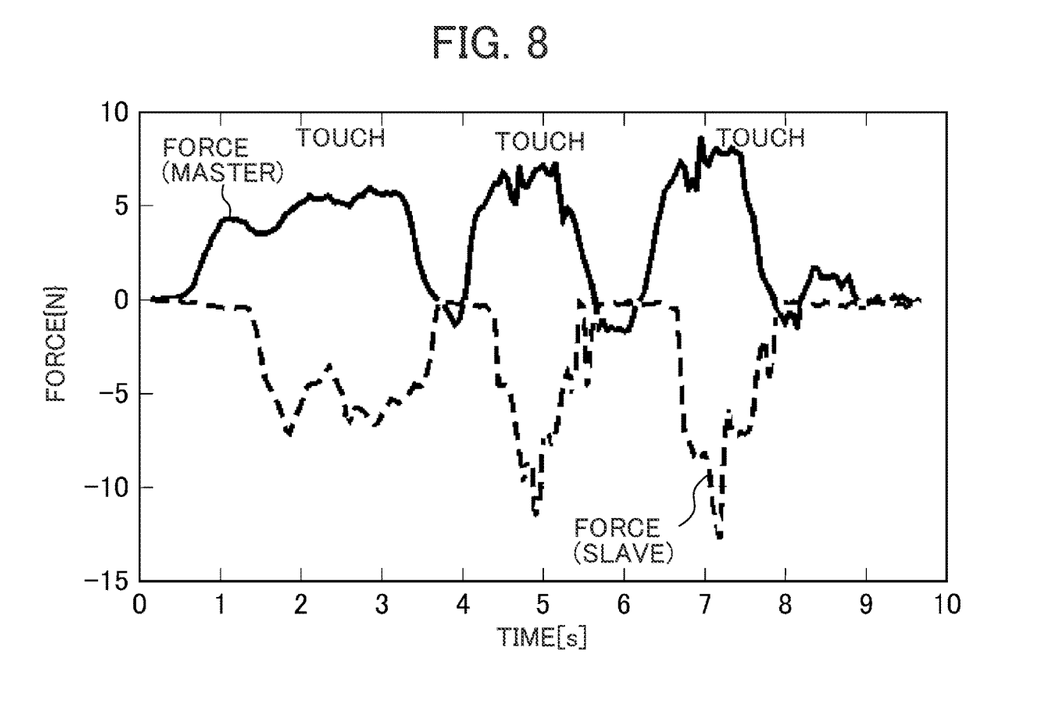
FIG. 8 is a schematic diagram showing force responses when effects are caused by communication delays (the block wiring diagram in FIG. 2) in the basic bilateral control shown in FIG. 1.

FIG. 8 is a schematic diagram showing force responses when effects are caused by communication delays (that is, the block wiring diagram in FIG. 2) in the basic bilateral control shown in FIG. 1. Note that FIG. 8 shows force responses when a fixed communication delay of 500 [ms] occurs. As shown in FIG. 8, it can be seen that when communication delays occur in the basic bilateral control (in a case of the block wiring diagram in FIG. 2), force balance is greatly lost, and accurate bilateral control cannot be attained.

As described above, in the haptic transmission system 1 according to the present embodiment, the master device 10 is provided with the position control section 13 and the force control section 14, and the slave device 20 is provided with the velocity control section and the force control section. Moreover, the master device 10 is provided with the delay compensation section 15 that performs communication delay compensation for the force control section 14. Accordingly, at the slave device 20, the environment can be touched with a force identical to a force app led to the master device 10 by the operator. In other words, haptics is transmitted from the master device 10 to the slave device 20, and soft touching motion over which the operator of the master device 10 is dominant is realized. Accordingly, accurate force balance is achieved under communication delays, and high-precision haptic transmission can be attained.

The haptic transmission system 1 configured as described above includes the position control section 13, the force control section 14, and the delay compensation section 15 in the master device 10, and includes the velocity control section 23 and the force control section 24 in the slave device 20. At the master device 10, the position control section 13 controls position in motion of the master device 10, based on information acquired from the motion of the master device 10, and information relating to a response of the slave device 20. The force control section 14 controls force in the motion of the master device 10, based on the information acquired from the motion of the master device 10, and the information relating to the response of the slave device 20. The delay compensation section 15 compensates for a communication delay in a communication path, with respect to control by the force control section 14. At the slave device 20, the velocity control section 23 controls velocity in motion of the slave device 20, based on information acquired from the motion of the slave device 20, and information relating to control from the master device 10.

The force control section 24 controls force in the motion of the slave device 20, based on the information acquired from the motion of the slave device 20, and the information relating to the control from the master device 10. Thus, at the slave device 20, the environment can be touched with a force identical to a force applied to the master device 10 by the operator. In other words, haptics is transmitted from the master device 10 to the slave device 20, and soft touching motion over which the operator of the master device 10 is dominant is realized. Accordingly, accurate force balance is achieved under communication delays, and high-precision haptic transmission can be attained.

The gain of position control in the motion of the slave device 20 is zero. Thus, when the slave device 20 makes touching motion, a force greater than a force applied to the system by the operator of the master device 10 can be prevented from being generated in the slave device 20 due to such action of the position control as to eliminate an error in position. Accordingly, when the slave device 20 makes touching motion, force balance with the master device 10 can be attained.

The velocity control section 23 of the slave device 20 makes velocity in the motion of the slave device 20 lower than when there is no delay in the communion path. Thus, action that brakes velocity in the motion of the slave device 20 is produced, and accurate force balance with the master device 10 can be attained in a situation where communication delays occur.

The position control section 13 of the master device 10 makes position tracking performance in the motion of the master device 10 lower than when there is no delay in the communication path. Thus, a manipulation force caused by effects of communication delays can be restrained in the slave device 20.

Note that modifications, improvements, and the like can be made to the present invention as appropriate within a scope where an advantageous effect of the present invention is brought about, and the present invention is not limited to the above-described embodiment. For example, although the above-described described embodiment is configured such that a position of a movable member, such as a position of the manipulator 11 of the master device 10 and a position of the contact 21 of the slave device 20, is detected, and a velocity or a force is calculated from the detected position, such a configuration does not impose a limitation. In other words, the information acquired from the motion of the master device 10 and the information acquired from the motion of slave device 20, such as the position, the velocity, or the force of the movable member, may be any of information that can be detected by a sensor and information that can be calculated based on another detected physical quantity.

The configuration shown as the block wiring diagram in the above-described embodiment can be implemented as software in which equivalent functions are defined. In such a case, a processor included in each of the master device 10 and the slave device 20 executes a program describing the functions in the block wiring diagram in the above-described embodiment. The configuration shown as the block wiring diagram in the above-described embodiment can be implemented as a hardware circuit, and also can be implemented as a combination of software and hardware. In other words, the processing in the above-described embodiment can also be executed by using any of hardware and software. To put it another way, it is only necessary that the functions capable of executing the above-described processing are included in the haptic transmission system 1, and it is not limited to the above-described examples what functional components and what hardware configuration is used to implement such functions. When the above-described processing is executed by using software, a program included in the software nay be installed into a computer from a network or a storage medium.

The storage medium storing the program may include a removable medium distributed separately from a body of the device, a storage medium incorporated in advance in the body of the device, or the like. The removable medium may include, for example, a magnetic disk, an optical disk, a magneto-optical disk, or the like. The optical disk may include, for example, a CD-ROM (Compact Disk-Read Only Memory), a DVD (Digital Versatile Disk), a Blu-ray Disc(R), or the like. The magneto-optical disk may include an MD (Mini-Disk) or the like. The storage medium incorporated in advance in the body of the device may include, for example, ROM, a hard disk, or the like in which the program is stored.

EXPLANATION OF REFERENCE NUMERALS 1 haptic transmission system, 10 master device, 11 manipulator, 12, 22 position detection section, 13 position control section, 14, 24 force control section, 15 delay compensation section, 16 actuator, 20 slave device, 21 contact, 23 velocity control section, 25 actuator, 30 network

The invention claimed is:

1. A haptic transmission system including a master device and a slave device connected through a communication path,
the master device comprising:
a position control section that controls a position in a motion of the master device, based on information acquired from the motion of the master device, and information relating to a response of the slave device;
a force control section that controls a force in the motion of the master device, based on the information acquired from the motion of the master device, and the information relating to the response of the slave device; and
a delay compensation section that compensates for a communication delay in the communication path, with respect to control by the force control section, and
the slave device comprising:
a velocity control section that controls a velocity in a motion of the slave device, based on information acquired from the motion of the slave device, and information relating to control from the master device; and
a force control section that controls a force in the motion of the slave device, based on the information acquired from the motion of the slave device, and the information relating to the control from the master device.

2. The haptic transmission system according to claim 1, wherein a gain of position control in the motion of the slave device is zero.

3. The haptic transmission system according to claim 1, wherein the velocity control section of the slave device makes the velocity in the motion of the slave device lower than when there is no delay in the communication path.

4. The haptic transmission system according to claim 1, wherein the position control section of the master device makes position tracking performance in the motion of the master device lower than when there is no delay in the communication path.

5. A haptic transmission system including a master device and a slave device connected through a communication path, the master device comprising a first hardware circuit including:
- a position controller that controls a position in a motion of the master device, based on information acquired from the motion of the master device, and information relating to a response of the slave device;
- a first force controller that controls a force in the motion of the master device, based on the information acquired from the motion of the master device, and the information relating to the response of the slave device; and
- a delay compensator that compensates for a communication delay in the communication path, with respect to control by the first force controller, and the slave device comprising a second hardware circuit including:
- a velocity controller that controls a velocity in a motion of the slave device, based on information acquired from the motion of the slave device, and information relating to control from the master device; and
- a second force controller that controls a force in the motion of the slave device, based on the information acquired from the motion of the slave device, and the information relating to the control from the master device.

6. The haptic transmission system according to claim 5, wherein a gain of position control in the motion of the slave device is zero.

7. The haptic transmission system according to claim 5, wherein the velocity controller of the slave device makes the velocity in the motion of the slave device lower than when there is no delay in the communication path.

8. The haptic transmission system according to claim 5, wherein the position controller of the master device makes position tracking performance in the motion of the master device lower than when there is no delay in the communication path.

* * * * *